UNITED STATES PATENT OFFICE.

JONAS W. AYLSWORTH, OF EAST ORANGE, NEW JERSEY, ASSIGNOR, BY DIRECT AND MESNE ASSIGNMENTS, TO THE HALOGEN PRODUCTS COMPANY, OF WEST ORANGE, NEW JERSEY, A CORPORATION OF NEW JERSEY.

INSULATING COMPOUND.

1,183,423.  Specification of Letters Patent.  Patented May 16, 1916.

No Drawing.  Application filed July 29, 1911.  Serial No. 641,326.

*To all whom it may concern:*

Be it known that I, JONAS W. AYLSWORTH, a citizen of the United States, and a resident of East Orange, Essex county, New Jersey, have invented certain new and useful Improvements in Insulating Compounds, of which the following is a specification.

My invention relates to insulating compounds, and particularly to the production of a new product capable of being used as an insulating material either by itself or when compounded with other substances.

The object of my invention is to produce an insulating compound which may be easily applied to the article to be protected, which is tough and flexible even at low temperatures, which adheres tenaciously to metals, is non-inflammable, and has many other valuable properties.

The wax-like bodies which are formed by chlorinating naphthalene and kindred hydro-carbon bodies by the methods disclosed in my Patents Nos. 914,222, 914,223 and 914,224, granted March 2, 1909, form valuable insulating compounds, but these compounds are very crystalline, and in many instances have not sufficient flexibility to permit their use for coating wire and other apparatus. I have found that when these wax-like and crystalline bodies are submitted to an oxidizing process, the resulting product possesses many valuable properties as an insulating material.

My invention may be carried out by exposing the heated vapors of the chlorinated substance or substances to oxygen, as for instance, by distillation in a current of oxygen or air. The oxidation may also be effected by treatment of the chlorinated substance or substances with an oxidizing agent or agents, as for example, strong nitric or chromic acid. Where nitric acid is used, nitration products may possibly be formed in addition to the oxidation products, and to these nitration products some of the improved properties may be due. As an example of the manner in which the process may be carried out, when nitric acid is employed, the chlorinated substance or substances are heated with strong nitric acid in proportions which vary according to the extent of the flexibility desired in the resulting product. These proportions may vary from 100 parts of chlorinated naphthalene and 25 parts of concentrated nitric acid to 100 parts of chlorinated naphthalene and 100 parts or more of the concentrated nitric acid. When the other methods are used, the oxidation may continue or be repeated until the desired consistency is attained as indicated by a test sample.

The oxidation product appears to be a mixture of several similar substances, and in all probability corresponds to the class of substances known as quinones, and when nitric acid is used, there are possibly some nitro-substitution products contained in the resulting product.

Where the process is carried out by treatment with an acid or acids, the acidic substances are afterward removed by treatment of the mass with caustic alkali, such as sodium hydroxid, potassium hydroxid, or ammonium hydroxid, and these alkalis and any salts of the same which are formed are removed by heating the mixture, repeatedly washing with water and decanting. This treatment breaks up and removes any unstable addition products which may be present in the product. When the melting point of the resulting product is higher than that of boiling water, the heating and washing may be carried on in closed vessels under pressure in order that the product may be melted and thoroughly washed.

The properties of the resultant substance vary somewhat, depending upon the chlorin content of the chlorinated substances treated, and the extent to which the oxidation has been carried on. The usual chlorin content of the chlorinated substances ranges between that corresponding to the tri-chloro-naphthalene and the hexa-chloro-naphthalene. The flexibility, physical structure, and melting point depend upon these factors, and I have found that the higher the melting point of the chlorinated substance is, the higher the melting point of the oxidation product will be. In general, however, the resulting product is very flexible and retains its flexibility to a remarkable degree even when near the freezing point of water, is practically non-crystalline, is non-inflammable, has a high dielectric strength, is very stable, and is not affected by acids or alkaline solutions. It adheres tenaciously to metals and contracts only slightly during solidification. These properties make the product an exceedingly useful one for insulating purposes, and particularly in those cases where an insulating and protective covering is desirable, as for example, in the trays or containers for storage battery cells, conducting wires, armatures, and armature and other coils.

The product may also be mixed or compounded with various organic bodies, such as rubber, linoleum, asphalt, pitch, paraffin, various hydrocarbon oils, and with various fibrous and inert organic and inorganic filling bodies, such as asbestos, barytes, infusorial earth, clay, and wood flour. Fabrics, such as tape for insulating purposes or the cotton or silk coverings on electrical conductors, may be impregnated with the product alone or after it has been mixed with a filling material. The product may be applied in molten condition in any convenient manner, as by dipping the articles to be coated or passing them through the molten mass.

The composition described herein is referred to in some of the claims as comprising oxidation products of solid chloro-naphthalenes or chloro-naphthalene compounds containing combined oxygen, which terms describe the product constitutionally as a chlorination product of naphthalene or other hydrocarbon containing a substantial percentage of oxygen. The product comprises a mixture of oxidation products of solid chloro- or halogenized naphthalenes, the halogen content of which chloro-naphthalenes, as stated, ranges between that corresponding to tri-, and that corresponding to hexa-chloro-naphthalene. The oxidation product is a mixture of substances whose crystalline forms are different in shape and melting point, and the product, after melting and cooling, takes the flexible, practically non-crystalline form, as stated. The treatment with caustic alkali removes acids used in the oxidation process and also any small quantities of chlorphthalic or other acids which may be formed during the process, chlorphthalic acid being soluble in alkali solution. Chlorphthalic acid is undesirable in the finished insulating compound. Traces of water used in washing the product should be removed by heating and the finished product, as stated, is formed by cooling from a melted condition.

Having now described my invention, what I claim and desire to protect by Letters Patent is as follows:—

1. An insulating compound comprising a mixture of oxidation products of solid chloro-naphthalenes, the same being chloro-naphthalene compounds containing combined oxygen, having different melting points and crystalline forms, which insulating compound is freed from unstable addition products, and is tough and flexible at room temperatures, non-inflammable and practically non-crystalline, substantially as described.

2. An insulating compound comprising a mixture of solid chloro-naphthalene compounds containing combined oxygen having different melting points and crystalline forms, which insulating compound is a cohesive, practically non-crystalline body, tough and flexible at room temperatures, and non-inflammable, substantially as described.

3. The process of making an insulating composition which is flexible and practically non-crystalline at room temperatures, which consists in oxidizing a wax-like halogen substitution product of naphthalene by heating the same with an oxidizing agent comprising an acid sufficient in amount to form a mixture of solid halogen compounds containing combined oxygen and insufficient in oxygen content to oxidize the product to a halogen-phthalic acid, treating the mass to remove acids used in or formed by the oxidation process, heating and melting the mass, and cooling the same, substantially as described.

4. The process of making an insulating compound which consists in oxidizing solid chlorinated naphthalene by heating the same with concentrated nitric acid in the proportion of from 25 to 100 per cent. of the chlorinated naphthalene to form a mixture of solid chloro-naphthalene compounds containing combined oxygen, treating the mass with caustic alkali to break up unstable addition products which may be present and removing the alkali salts formed by the same, substantially as described.

This specification signed and witnessed this 27th day of July, 1911.

JONAS W. AYLSWORTH.

Witnesses:
HENRY LANAHAN,
ANNA R. KLEHM.